United States Patent [19]
Mueller

[11] 3,831,461
[45] Aug. 27, 1974

[54] DIFFERENTIAL TRANSMISSION

[76] Inventor: Otto Mueller, 13 Byfield Ln., Dearborn, Mich. 48120

[22] Filed: Nov. 3, 1972

[21] Appl. No.: 303,629

[52] U.S. Cl. .................................. 74/711, 192/60
[51] Int. Cl. ............................................. F16h 1/44
[58] Field of Search ................................. 74/711

[56] References Cited
UNITED STATES PATENTS

| | | | |
|---|---|---|---|
| 2,978,929 | 4/1961 | Roberts | 74/711 |
| 3,230,795 | 1/1966 | Mueller | 74/711 |
| 3,393,583 | 7/1968 | Mueller | 74/711 |
| 3,546,969 | 12/1970 | Gibson et al | 74/711 |

Primary Examiner—Benjamin W. Wyche
Assistant Examiner—J. Reep
Attorney, Agent, or Firm—Olsen & Stephenson

[57] ABSTRACT

A differential transmission for automobiles which has a hydraulic mechanism in the differential carrier for limiting the differential action that can occur between the two driven axle shafts. A closed hydraulic circuit is provided which has compensation means to accommodate volumetric changes of the hydraulic fluid resulting from temperature changes, and the circuit is located in the differential carrier so as to provide optimum use of space provided therein.

8 Claims, 15 Drawing Figures

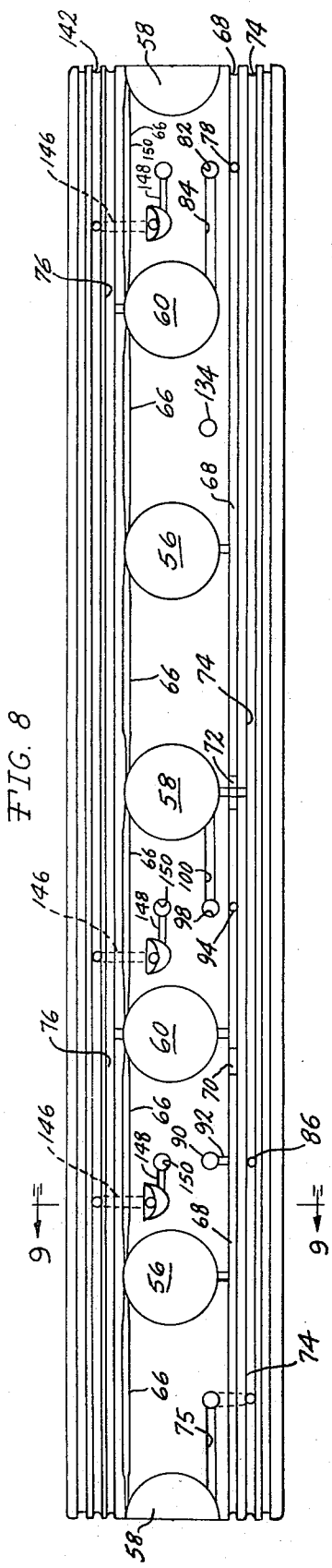
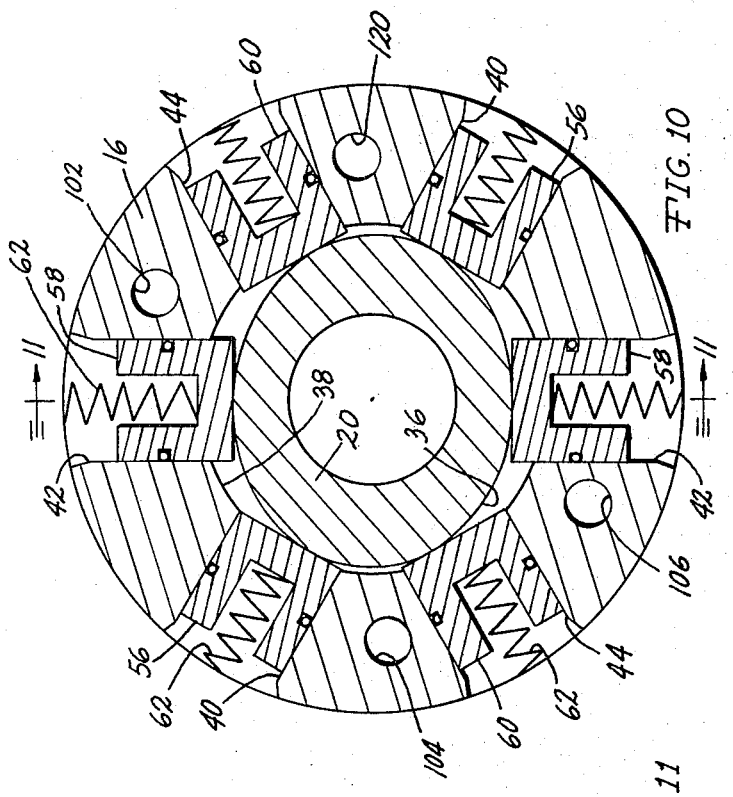
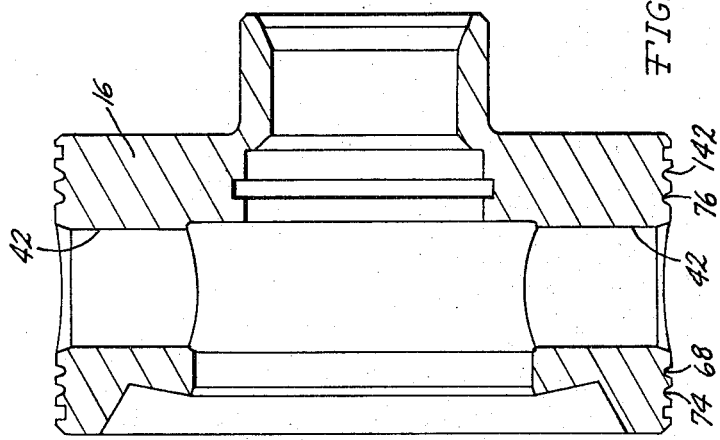
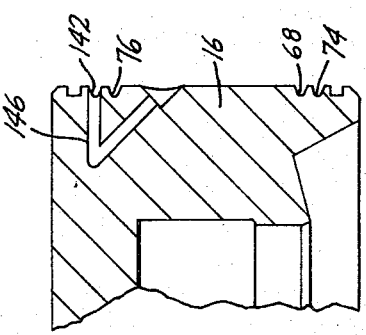

3,831,461

DIFFERENTIAL TRANSMISSION

BACKGROUND OF THE INVENTION

The present invention relates to a differential transmission adapted primarily, but not exclusively, for use with motor vehicles.

This invention includes improvements over differential transmissions of the type disclosed in U.S. Pat. Nos. 3,230,795, issued Jan. 25, 1966; 3,393,582, issued July 23, 1968; and 3,393,583, issued July 23, 1968. These patents disclose hydraulic mechanisms in differential transmissions for controlling the relative turning that can occur between the two driven axle shafts of a motor vehicle. A need remains to provide a differential transmission of this character which can be readily interchangeable with standard transmissions now in use on motor vehicles, which has minimum maintenance and service problems, and which can also be produced economically to meet this need.

SUMMARY OF THE INVENTION

The present invention has overcome the inadequacies of the prior art devices by substantially reducing the volume of hydraulic fluid that is required to be contained within a closed system for actuation of the mechanism, and by being constructed and arranged so that it can be used in any conventional differential case or carrier without materially changing the general shape or configuration of the complete differential carrier assembly. Thus, the present invention can be used with a differential carrier assembly which employs either a closed casing or an open carrier in which the differential gears are mounted.

According to one form of the present invention, a differential transmission is provided comprising a carrier having a ring gear flange at one end for mounting a ring gear, a set of differential gears mounted in the carrier including a pair of side gears for driving a pair of aligned axle shafts, a hydraulic mechanism in the carrier adjacent to one end thereof having a closed hydraulic circuit and being responsive to relative turning of the side gears to restrict turning of the one side gear located adjacent to the one end of the carrier. The closed hydraulic circuit is located partially within the ring gear flange and is filled with hydraulic fluid to the exclusion of air. Thus, a portion of the hydraulic mechanism is located within the ring gear flange, thereby utilizing space which otherwise is not utilized and permitting the remainder of the differential case or carrier to be constructed essentially the same as the conventional differential transmissions now utilized in motor vehicles. The new arrangement also reduces substantially the quantity of hydraulic fluid that is provided in the closed hydraulic circuit, thereby substantially reducing service and maintenance problems.

It is among the objects of the present invention to provide a differential transmission that controls the extent of differential action that can occur between the two driven axle shafts and which employs a hydraulic mechanism for this purpose which is characterized by its economical cost, its low maintenance and service requirements, and its construction and arrangement that allows it to be interchangeable with standard differential transmissions now being manufactured for automobiles.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 8 is a developed view of the circumferential surface of the carrier member illustrated in FIG. 11;

FIG. 9 is a fragmentary section taken on the line 9—9 of FIG. 8;

FIG. 10 is a sectional view taken on the line 10—10 of FIG. 1;

FIG. 11 is a fragmentary section, with portions removed, taken on the line 11—11 of FIG. 10;

DESCRIPTION OF THE PREFERRED EMBODIMENT

Figures 1, 2:
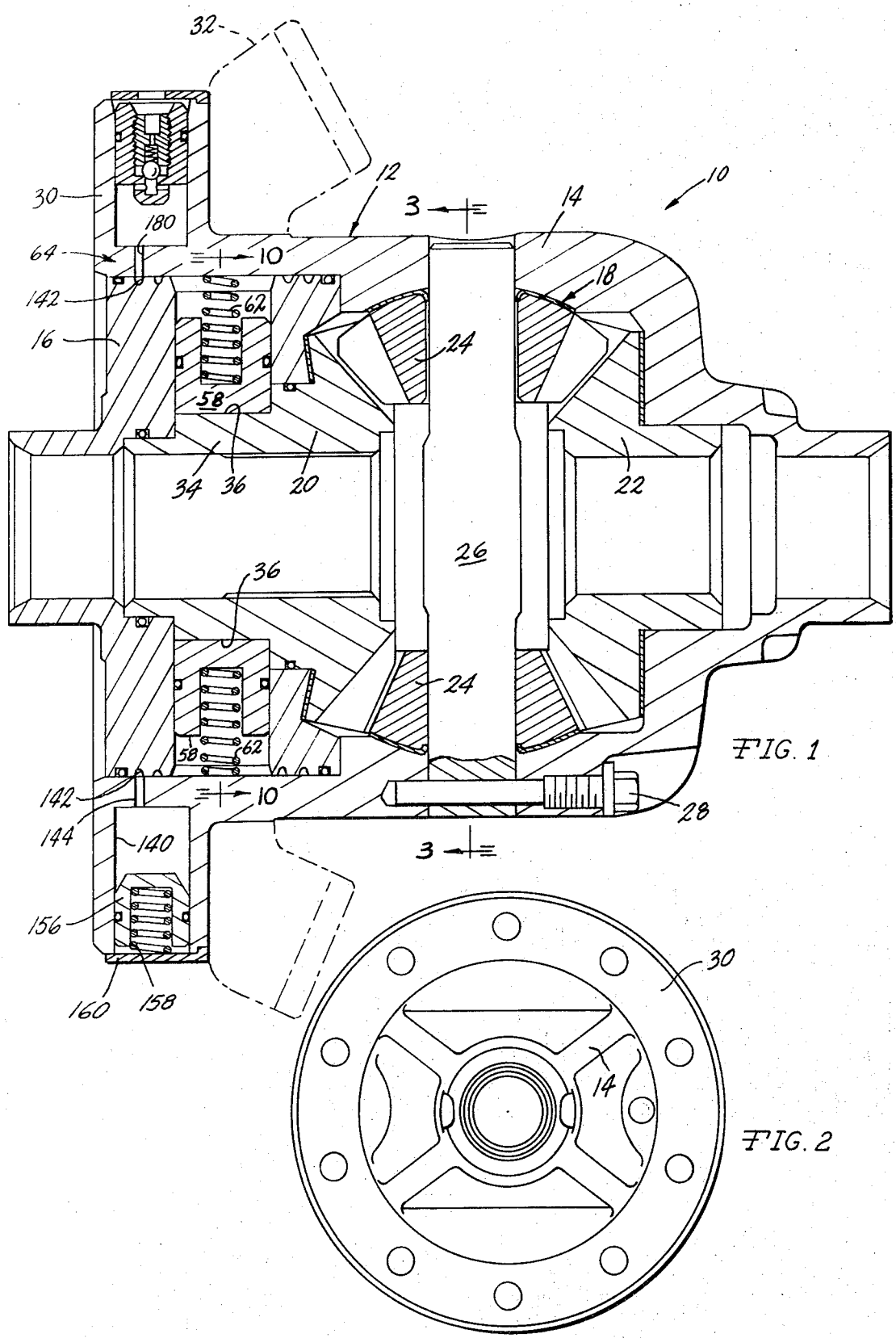
FIG. 1 is a vertical sectional view along the axis of one form of a differential transmission embodying the present invention.
FIG. 2 is an end elevational view in reduced scale as seen from the right end of FIG. 4.
Figure 4:
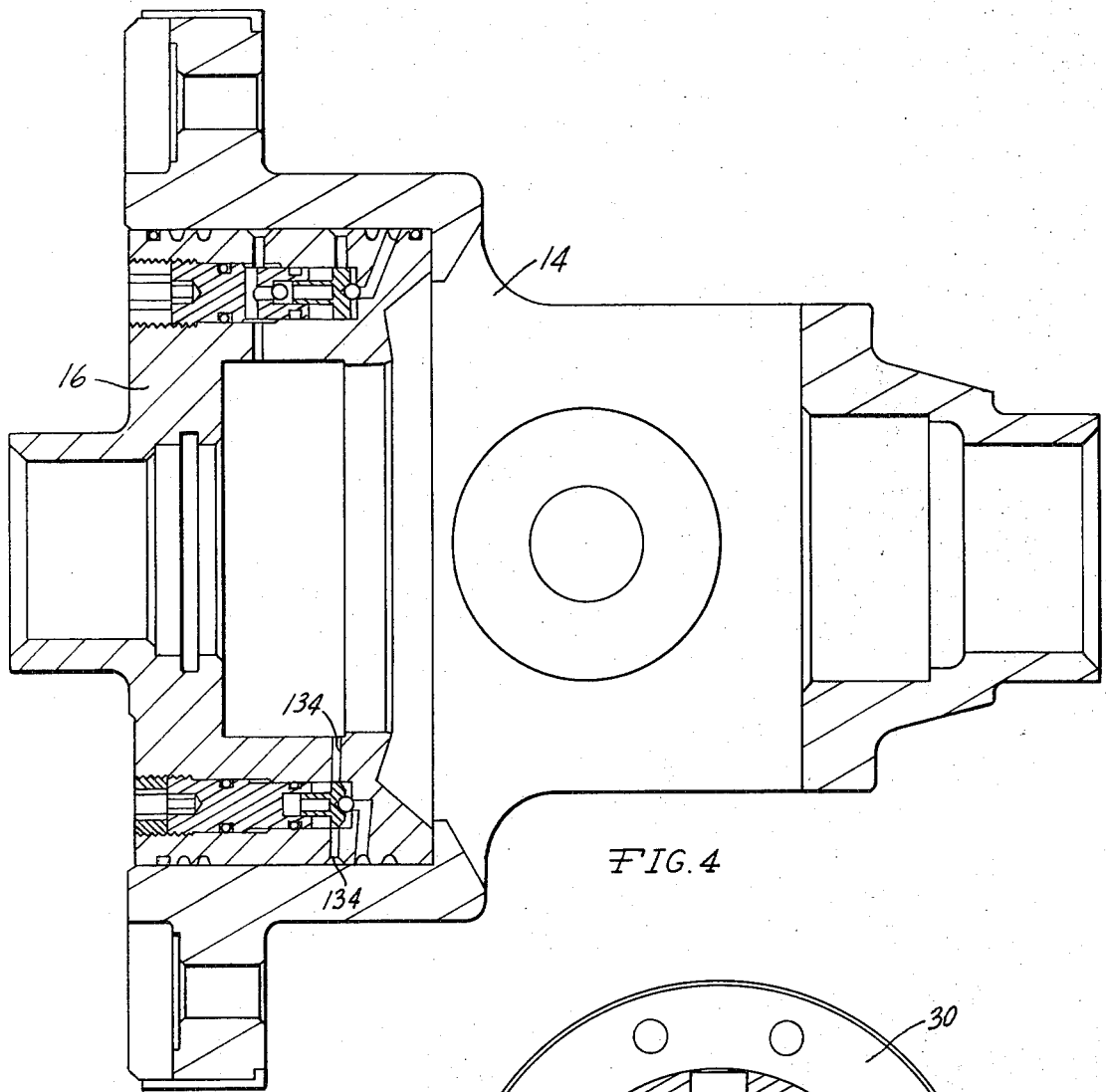
FIG. 4 is a horizontal sectional view taken on the line 4—4 of FIG. 5 with portions removed to better illustrate details of the hydraulic circuits.
Figure 3:
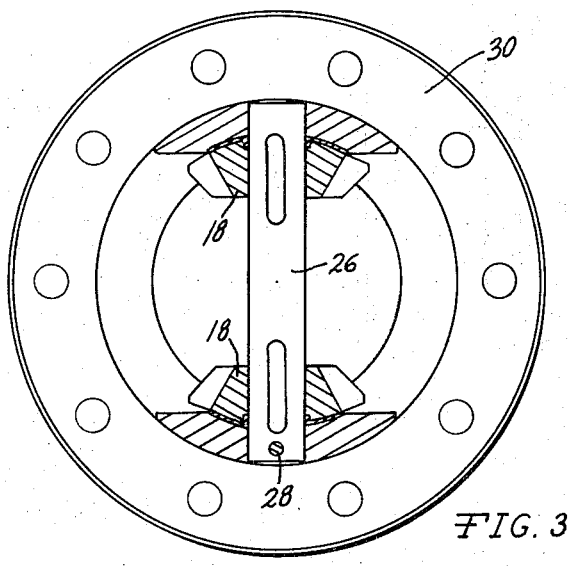
FIG. 3 is a sectional view in reduced scale taken on the line 3—3 of FIG. 1.
Figure 5:
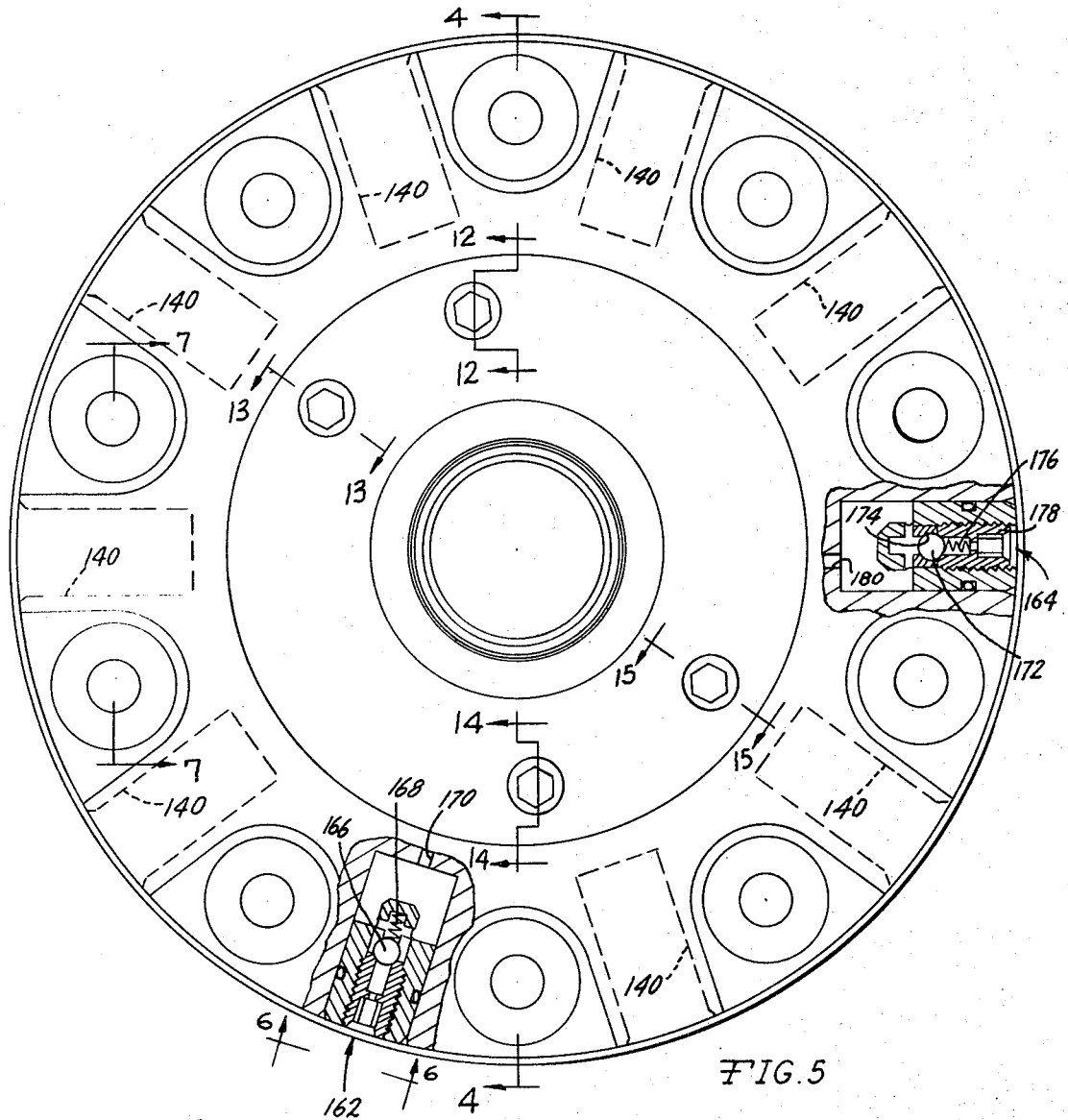
FIG. 5 is an end elevational view, with portions in section, as seen from the left of FIG. 4.
Figure 7:
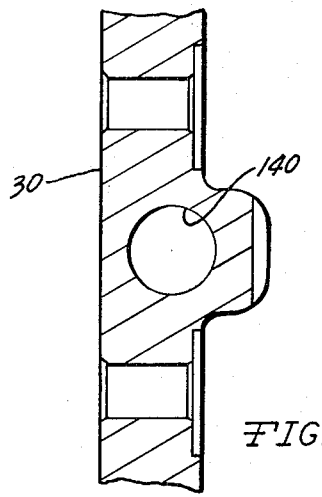
FIG. 7 is a fragmentary section taken on the lines 7—7 of FIG. 5.
Figure 6:
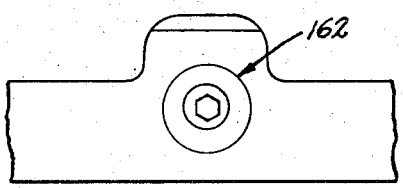
FIG. 6 is a fragmentary end elevational view of the ring gear flange as seen in the direction of the arrows 6—6 of FIG. 5.
Figure 12:
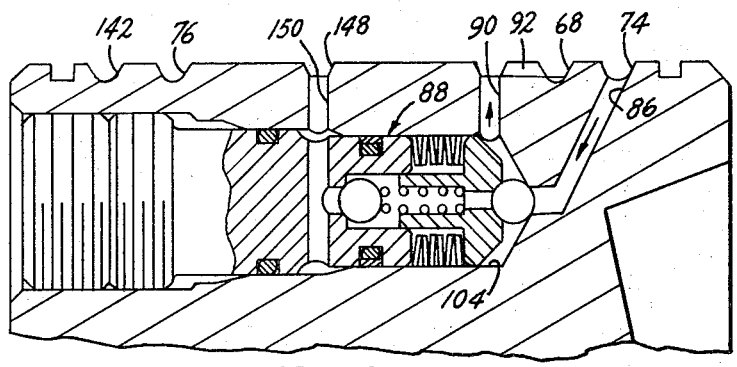
FIG. 12 is an enlarged fragmentary section showing details of structure on the line 12—12 of FIG. 5.
Figure 13:
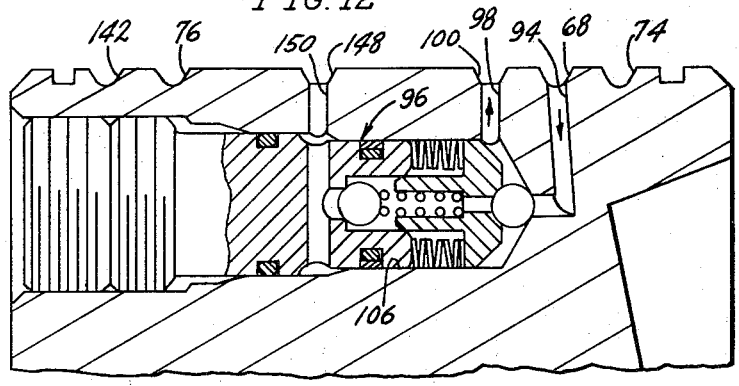
FIG. 13 is an enlarged fragmentary section showing details of structure on the line 13—13 of FIG. 5.
Figure 14:
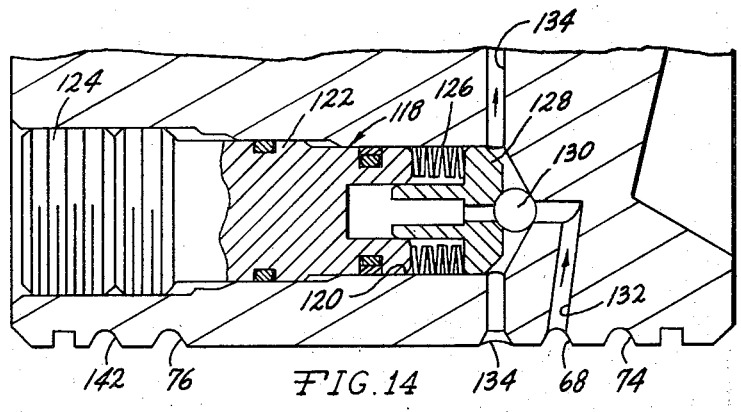
FIG. 14 is an enlarged fragmentary section showing details of structure on the line 14—14 of FIG. 5.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The differential transmission 10 has a differential carrier or casing 12 which includes the first carrier section 14 and the second carrier section 16. The latter is telescoped into one end of the former. A set of differential gears 18, comprising one side gear 20, the other side gear 22, pinion gears 24 in mesh with side gears 20 and 22 and the pinion shaft 26 are mounted in the one carrier section 14. A suitable pinion shaft retainer screw 28 is threadedly connected in the one carrier section 14 and extends through a hole in the pinion shaft 26 for retaining the latter in place. At one end of the first carrier section 14 is a ring gear flange 30 on which is adapted to be mounted a ring gear 32, as is shown in broken lines.

The side gear 22 and the pinion gears 24 are the conventional type heretofore used, but the side gear 20 has been modified to embody features of the present invention. As can be seen in FIGS. 1 and 10 of the drawings, the side gear 20 has a hub portion relatively longer than hub portions conventionally used, and around the outer periphery of the hub portion defines a plurality of radially directed rise and fall cam surfaces 36. In the illustrated embodiment, two equiangular rise and fall portions are utilized. The two portions are arranged so that they will provide both dynamic and static balance. The portion of the side gear 20 which contains the cam surfaces 36 is located radially inward of a complementary portion 38 in the second carrier section 16 in which are located a plurality of radially inwardly directed, circumferentially aligned pairs of pressure chambers 40, 42 and 44. Located within the pressure chambers 40, 42 and 44 are pistons 56, 58 and 60 which are arranged for reciprocation therein. The radially inner ends of the pistons 56, 58 and 60 are adapted to travel on the cam surfaces 36 for effecting reciprocal movement of the pistons. The latter are spring biased by the compression springs 62 against the cam surface 36. As can be seen in FIG. 1, the compression springs 62 are held in compression between the associated pistons and the radially inner surface of the first carrier section 14. Thus, when the one side gear 20 rotates relative to the carrier 12, the rise and fall cam surfaces 36 will act against the spring biasing action of the springs 62 to reciprocate the pistons 56, 58 and 60 within their respective pressure chambers 40, 42 and 44. Means 64 are formed between the outer periphery of the second carrier section 16 and the inner surface of the first carrier section 14, and also in the flange 30 for providing a closed hydraulic circuit in communication with each of the pressure dhambers 40, 42 and 44 to control the rate at which the pistons 56, 58 and 60 can reciprocate, thereby controlling the rate at which the one side gear 20 can rotate relative to the differential carrier 12. This will control the differential action that can occur between the two shafts, not shown, that extend into opposite ends of the differential carrier 12.

The means which provides the closed hydraulic circuit for controlling the rate of differential action that can occur embodies some of the features of the differential transmission disclosed in the aforesaid U.S. Pat. No. 3,393,583. The six pressure chambers 40, 42 and 44 are arranged equiangularly about the axis of rotation of the cam surfaces 36 so that the pressure chambers are disposed 60 degrees apart. The two pressure chambers 40 comprise a first set of chambers, the two pressure chambers 42 comprise a second set of chambers and the two pressure chambers 44 comprise a third set of pressure chambers. The pistons 56, 58 and 60 which are located in these sets of pressure chambers are also in first, second and third sets, and each piston of one set moves in unison with the other piston of that set.

As previously indicated, the pistons 56, 58 and 60 reciprocate in their respective chambers when the one side gear 20 rotates relative to the differential carrier 12. When the associated chambers are filled with hydraulic fluid, reciprocation can occur by virtue of passage means which permit pumping of the hydraulic fluids in and out of the chambers. In the present embodiment of the invention an annular passageway or duct 66 is provided which passes in communication with each of the pressure chambers as can be seen best in FIG. 8. By virtue of this arrangement; the hydraulic fluids in the pressure chambers are pumped back and forth between one another at a rate permitted by the dimensions of the passageway 66. Thus, the passageway 66 is construed to be a flow control groove which allows limited differential action to occur at all times between the side gears 20 and 22 at the rate permitted by the flow characteristics of this groove.

If torque above a predetermined magnitude is applied which seeks to cause differential action to occur, additional passage means are provided to allow additional limited differential action to occur. The additional passage means will now be described with particular reference to FIGS. 8, 12, 13 and 15. The two pressure chambers 56 are in communication with a groove 68, the latter being blocked at 70 and 72. The two pressure chambers 58 are in communication with the groove 74 via groove and duct 75, and the pressure chambers 60 are in communication with the groove 76.

Figure 15:
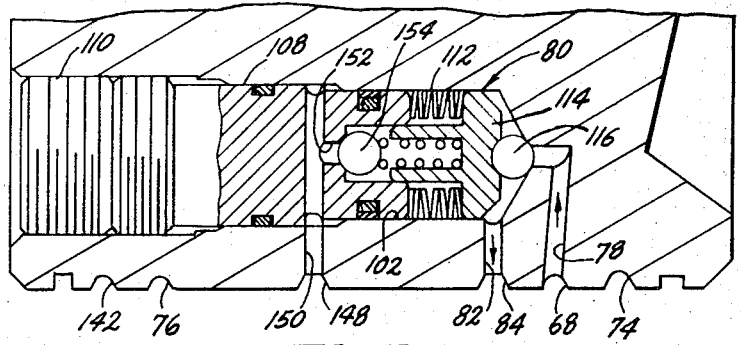
FIG. 15 is an enlarged fragmentary section showing details of structure of FIG. 5.

If a torque of sufficient magnitude is applied to cause differential action so that the pistons in pressure chambers 56 move radially outward to the top of the chamber, fluid will flow out of chambers 56, through the groove 68 to the port 78 for flow through the torque bias control valve 80, FIG. 15, and to the chambers 60 via the port 82 and the groove 84. Similarly, when the pistons in chambers 58 advance to the top or radially outer ends, fluid will flow out of chambers 58, through the groove 74 to port 86 for flow through the torque bias control valve 88, FIG. 12, and then to the chambers 56 via the port 90, small groove 92 and groove 68. Again, when the pistons in chambers 60 advance to their top or radially outer ends, fluid will flow out of chambers 60, through the closed segment of groove 68 to the port 94 for flow through the torque bias control valve 96, FIG. 13, and then to the chambers 58 via the port 98 and groove 100.

The three torque bias control valves 80, 88 and 96 are constructed the same and only valve 80 will be described. These valves are mounted in bores 102, 104 and 106 in the second carrier section 16. The torque bias control valve 80 has a threaded member 108 that is screwed into bore 102 to a selected position, and set screw 110 is used to secure the member 108 in its set position. A disc spring 112 is seated on the inner end of the member 108 and urges the plunger 114 against the ball check member 116 so that the latter closes the port 78. When the pressure exerted by the pistons in the pressure chambers 56 on the hydraulic fluid therein exceeds the biasing pressure on the ball check member 116, the valve 80 will open allowing flow of hydraulic fluid through the closed circuit. The same operation will occur simultaneously at valves 88 and 96, thereby allowing differential action to occur between the side gears 20 and 22. The biasing pressure exerted by the spring 112 is established be the setting of the member 108.

An overload protection relief valve 118 is also provided which is normally set to open at a higher pressure than the torque bias control valves 80, 88 and 96. The relief valve 118 is located in the bore 120 in the second carrier section 16. It has a threaded member 122 that is screwed into bore 120 to a selected position, and set screw 124 is used to secure the member 122 in its set position. A disc spring 126 is seated on the inner end of the member 122 and urges the plunger 128 against the ball check member 130 so that the latter closes the port 132. The latter is in communication with the groove 68 for releasing pressure therein. In the event the pressure of the fluid in the closed circuit becomes excessively high, it will open the valve 118 by moving the ball 130 so that hydraulic fluid can flow through the valve and out the port 134 which is in communication with the space between cam surfaces 36 and the inner portion 38 of the carrier section 16.

The pressure chambers 56, 58 and 60 and the cam surfaces 36 are constructed and arranged so that when relative rotation occurs between the carrier 12 and the side gear 20, the volumetric displacement of one set of pistons for any selected time interval is substantially equal to the algebraic sum of the volumetric displacement of the other two sets of pistons. Thus, a constant volume of hydraulic fluid is retained in the closed circuit, and this constant volume will be displaced between the pressure chambers to the extent permitted, first through flow control groove 66, and then from the flow of the hydraulic fluid through the described passage means which includes the three torque bias control valves 80, 88 and 96. If the torque applied to the differential transmission 10 becomes excessively high, pressure relief to the system can be provided by the relief valve 118.

The differential transmission 10 also includes, in effect, a closed reservoir which is completely filled with hydraulic fluid to the exclusion of air. This reservoir is the source of hydraulic fluid for replenishing fluid in the closed circuit, if required. By virtue of this arrangement, there will be no problem arising from entrained air being passed between the various pressure chambers 56, 58 and 60 during pumping action of the pistons; and by virtue of the pistons pumping only hydraulic fluid, positive and definite characteristics will be achieved in controlling the differential action that is desired between the side gears 20 and 22. The closed reservoir that provides the source of hydraulic fluid includes the space between the complementary portion 38 and the cam surfaces 36, the plurality of radial bores 140, and passageways extending between these bores and space between portion 38 and cam surfaces 36. Suitable seals are provided to maintain the reservoir and closed circuit free of air.

Should the pumping pressure within the pressure chambers 56, 58 and 60 become sufficiently great so that leakage occurs from these chambers back to the interior of the carrier 12, means are provided for replenishing the hydraulic fluid within the pressure chambers. If such need for replenishment occurs, the pistons 56, 58 and 60 will act as pumps to draw hydraulic fluid from the interior of the differential carrier 12 to the closed circuit. For this purpose, an annular groove 142 is provided which is in communication with each of the radial bores 140 via the ducts 144 and with the valves 80, 88 and 96 between ducts 146, FIG. 8, which lead to the grooves 148 and the ducts 150. Referring to FIG. 15, the duct 150 is in communication with the valve port 152 which is normally closed by the ball check member 154. If pressure on the closed circuit side becomes less than the pressure on the left side of the ball check member 154, the latter will open allowing hydraulic fluid to flow into the closed circuit side of the valve 80. However, when the pressure on the closed circuit side is greater, the ball check valve member 154 will remain closed.

The reservoir for the hydraulic fluid also includes accommodation means for accommodating volumetric changes that may occur in the hydraulic fluid because of temperature changes. In the illustrated embodiment of the invention, the volumetric compensator or accommodation means is located within the bores 140 and comprises plungers 156 which are spring biased toward the radially inner end of the bores 140 between the compression springs 158. As can be seen in FIG. 1, the bores 140 are open at the radially outer end and are closed by a closure band 160. The compression springs 158 are placed in compression between the closure band 160 and the interior of the pistons 156. If the hydraulic fluid in the reservoir expands due to temperature changes, the thermal expansion will be accommodated by the springs 158 allowing the pistons to move radially outward.

Two of the bores in the flange 30 are utilized for a supply valve assembly 162 and a vent valve assembly 164. The supply valve assembly 162 includes a ball check member 166 that is normally maintained in the closed position to prevent fluid from being discharged from the reservoir, but which can be moved to an open position against the action to the spring 168 to allow hydraulic fluid to be introduced into the reservoir via the duct 170.

The vent valve assembly 164 is similar to the supply valve assembly 162, except that the ball check member 172 is held against the seat 174 by the compression spring 176. When it is desired to fill the reservoir with hydraulic fluid, venting can occur after the threaded member 178 is screwed out a sufficient distance to provide clearance between the ball member 172 and the threaded member 178. The compression spring will hold the ball on the seat so that air within the reservoir can then flow around the ball and out the central axis of the threaded member 178. Venting from the reservoir will occur through the duct 180.

From the foregoing description it will be observed that the accommodation means and a portion of the closed hydraulic circuit are located within the flange 30 on which the ring gear is adapted to be mounted. The outer configuration of the differential carrier 12 can be essentially the same as a differential transmission of the types used heretofore which lack means for controlling the differential action. Thus, the present invention is readily interchangeable with differential transmissions heretofore used. The compact arrangement of the hydraulic mechanism also enables it to be used with differential transmissions which employ either a closed differential case or an open carrier of the type illustrated in the drawings of the present invention.

It is claimed:

1. A differential transmission comprising a carrier having a ring gear flange at one end for mounting a ring gear, a set of differential gears mounted in said carrier including a pair of side gears for driving a pair of aligned axle shafts, a hydraulic mechanism in said carrier adjacent to said one end thereof having a closed hydraulic circuit and being responsive to relative turning of said side gears to restrict turning of the one side gear located adjacent to said one end of the carrier, said closed hydraulic circuit being located partially within said ring gear flange and filled with hydraulic fluid to the exclusion of air, the portion of said hydraulic circuit located in said ring gear flange including means for accommodation of pressure increases of the hydraulic fluid resulting from temperature changes that occur in said hydraulic fluid, said ring gear flange having a plurality of radial bores open to the outer periphery of said ring gear flange, and closure means at said outer periphery closing the outer ends of said bores, said accommodation means including compensating pistons spring-biased toward the inner ends of said bores, said inner ends defining chambers that are a portion of said closed hydraulic circuit.

2. The differential transmission that is defined in claim 1, wherein the portion of said hydraulic circuit located in said ring gear flange includes an inlet valve assembly for charging hydraulic fluid into said hydraulic circuit.

3. The differential transmission that is defined in claim 1, wherein the portion of said hydraulic circuit located in said ring gear flange includes a vent valve assembly for bleeding off air in said hydraulic circuit when charging hydraulic fluid thereinto.

4. The differential transmission that is defined in claim 1, wherein the portion of said hydraulic circuit located in said ring gear flange includes an inlet valve assembly for charging hydraulic fluid into said hydraulic circuit, and a vent valve assembly for bleeding off air in said hydraulic circuit when charging hydraulic fluid thereinto.

5. The differential transmission that is defined in claim 4, wherein said ring gear flange has a plurality of radial bores in which said inlet valve assembly and said vent valve assembly are located.

6. The differential transmission that is defined in claim 5, wherein the last-named bores open to the radially outer periphery of said ring gear flange and said closure means is a closure band that encircles said outer periphery of said ring gear and overlaps the outer ends of said last-named bores.

7. The differential transmission that is defined in claim 1, wherein said hydraulic mechanism includes cam means defining circumferentially arranged rise and fall cam surfaces for rotation with said one side gear, a plurality of radially directed pressure chambers located in said carrier, a plurality of pistons in said chambers operatively engaging said cam surfaces for reciprocation in response to rotation of said one side gear relative to said carrier, restrictive passage means providing communication between sets of said pressure chambers, said pressure chambers and said cam surfaces being arranged so that when relative rotation occurs between said carrier and said one side gear the pistons will reciprocate to transfer hydraulic fluid in said circuit to the extent permitted by said restrictive passage means.

8. The differential transmission that is defined in claim 7, wherein said sets of pressure chambers are three in number, and said cam surfaces are two in number and are diametrically opposed.

* * * * *